United States Patent
Marchini et al.

(10) Patent No.: US 9,498,926 B2
(45) Date of Patent: Nov. 22, 2016

(54) PROCESS AND APPARATUS FOR BUILDING TYRES FOR VEHICLE WHEELS

(75) Inventors: Maurizio Marchini, Milan (IT); Michele Ballabio, Milan (IT); Stefano Boracco, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 13/501,701

(22) PCT Filed: Sep. 14, 2010

(86) PCT No.: PCT/IB2010/054135
§ 371 (c)(1),
(2), (4) Date: Jun. 26, 2012

(87) PCT Pub. No.: WO2011/045688
PCT Pub. Date: Apr. 21, 2011

(65) Prior Publication Data
US 2012/0255667 A1    Oct. 11, 2012

Related U.S. Application Data

(60) Provisional application No. 61/272,683, filed on Oct. 21, 2009.

(30) Foreign Application Priority Data

Oct. 13, 2009   (IT) .............. MI2009A1745

(51) Int. Cl.
*B29D 30/30*   (2006.01)
*B29D 30/16*   (2006.01)

(52) U.S. Cl.
CPC .......... *B29D 30/305* (2013.01); *B29D 30/165* (2013.01); *B29D 30/3057* (2013.01)

(58) Field of Classification Search
CPC .............. B29D 30/1642; B29D 30/165; B29D 30/1657; B29D 30/28; B29D 30/305;
(Continued)

(56) References Cited

U.S. PATENT DOCUMENTS 4,370,183 A * 1/1983 Albo .................... B29D 30/08
                                                                    156/117
6,601,750 B2 * 8/2003 Palladino et al. ........... 228/44.3

FOREIGN PATENT DOCUMENTS

EP    0 956 940 A1   11/1999
EP    1 535 727 A1    1/2005
(Continued)

OTHER PUBLICATIONS

Machine-generated English language translation of the Claims and Abstract of JP 10-2009-0005568 (original document dated Jan. 2009).*

(Continued)

*Primary Examiner* — Martin Rogers
(74) *Attorney, Agent, or Firm* — Finnegan, Henderson, Farabow, Garrett & Dunner, L.L.P.

(57) ABSTRACT

A process and an apparatus for building tires for vehicle wheels includes assembling at least one tire component through laying of strip-like elements disposed circumferentially close to each other on a deposition surface radially external to the forming drum, wherein laying of each strip-like element includes: radially moving the strip-like element close to the deposition surface; locking a central portion of the strip-like element against the deposition surface; and pulling the strip-like element in opposite directions starting from the central portion toward the opposite ends thereof, while the central portion is maintained in a locked condition against the deposition surface, so as to progressively lay down the strip-like element against the deposition surface.

14 Claims, 8 Drawing Sheets

(58) Field of Classification Search
CPC .............. B29D 30/3057; B29D 2030/1685; B29D 2030/3085
USPC ....... 156/117, 133, 397, 405.1, 406.4, 406.6, 156/408, 421.6, 494
See application file for complete search history.

(56) References Cited

FOREIGN PATENT DOCUMENTS

| | | | | |
|---|---|---|---|---|
| EP | 1 535 727 A1 | 6/2005 | | |
| GB | 987983 | 3/1965 | | |
| JP | S38-014020 | 8/1963 | | |
| JP | 2008221851 A | 9/2008 | | |
| KR | 10-2009-0005568 | 1/2009 | | |
| WO | WO 01/38077 A1 | 5/2001 | | |
| WO | WO 03/106152 A1 | 12/2003 | | |
| WO | WO 2008/015486 | * | 2/2008 | ............ B29D 30/16 |
| WO | WO 2009/033493 | * | 3/2009 | ............ B29D 30/16 |
| WO | WO 2009/068939 | * | 6/2009 | ............ B29D 30/16 |
| WO | WO 2009/068939 A1 | 6/2009 | | |

OTHER PUBLICATIONS

Machine generated English language translation of KR 2009-0005568 (original document dated Jan. 2009).*

International Preliminary Report on Patentability for International Application No. PCT/IB2010/054135 dated Apr. 17, 2012.

International Search Report from the European Patent Office for International Application No. PCT/IB2010/054135, mailing date Jan. 25, 2011.

Office Action of Chinese Application No. 201080045889.5 dated Jan. 24, 2014, 18 pages.

Office Action of Chinese Application No. 201080045889.5 dated Dec. 3, 2014, 11 pages.

Decision of Rejection of Japanese Patent Application No. 2012-533710, mailed Apr. 1, 2015 (2 pages).

Office Action mailed Apr. 30, 2014 for Japanese Patent Application No. 2012-533710 (3 pages).

* cited by examiner

PROCESS AND APPARATUS FOR BUILDING TYRES FOR VEHICLE WHEELS

CROSS REFERENCE TO RELATED APPLICATIONS

This application is a national phase application based on PCT/IB2010/054135, filed Sep. 14, 2010, which claims the priority of Italian Patent Application No. MI2009A001745, filed Oct. 13, 2009, and the benefit of U.S. Provisional Application No. 61/272,683, filed Oct. 21, 2009, the content of all of which is incorporated herein by reference.

BACKGROUND OF THE INVENTION

1. Field of the Invention

The present invention relates to a process and an apparatus for building tyres for vehicle wheels.

2. Description of the Related Art

A tyre for vehicle wheels generally comprises a carcass structure including at least one carcass ply having respectively opposite end flaps in engagement with respective annular anchoring structures integrated into the regions usually identified as "beads".

Associated with the carcass structure is a belt structure comprising one or more belt layers, arranged in superposed relationship with each other and the carcass ply and provided with textile or metallic reinforcing cords having a crossed orientation and/or being substantially parallel to the circumferential extension direction of the tyre.

A tread band of elastomeric material, like other semifinished products constituting the tyre, is applied to the belt structure at a radially external position.

In addition, at an axially external position, respective sidewalls of elastomeric material are applied to the side surfaces of the carcass structure, each extending from one of the side edges of the tread band until close to the respective annular anchoring structure to the beads.

After building of the green tyre through assembly of the respective semifinished products, a curing and moulding treatment is generally carried out which aims at determining the structural stabilisation of the tyre by cross-linking of the elastomeric material, as well as impressing the tread band with a desired tread pattern and stamping possible distinctive graphic signs on the sidewalls.

Within the scope of the present invention and in the following claims, by "elastomeric material" it is intended a composition comprising at least one elastomeric polymer and at least one reinforcing filler. Preferably, this composition further comprises additives such as cross-linking agents and/or plasticizers. Due to the presence of the cross-linking agents, this material can be cross-linked by heating, so as to form the final article of manufacture.

To the aims of the present description and the following claims, by "strip-like element" it is intended an elongated article of manufacture cut to size which has a cross-section profile of flattened conformation and comprises one or more cords of textile and/or metallic material, extending parallel to the longitudinal extension of the strip-like element itself and embedded into or at least partly coated with at least one layer of elastomeric material.

Document WO 01/38077, in the name of the same Applicant, discloses a method and an apparatus for production of a belt structure of a tyre for vehicle wheels. The belt structure is built using strip-like elements laid down in circumferential sequence and in mutually approached relationship on a toroidal support. The apparatus contemplates the presence of a laying unit comprising two presser elements, each carried by a support element movable along a guide structure, upon the action of transverse-actuation devices, in a substantially axial direction of the toroidal support. Each presser element is movable along the strip-like element, exerting a counter-action against the radially external surface of the toroidal support. Also preferably in engagement with each support element is at least one auxiliary retaining element that lends itself to co-operate with the respective presser element so as to retain the strip-like element at the instants intervening between cutting of said strip-like element from a continuous ribbon and application of same onto the toroidal support.

Through movement of the support elements away from each other, a simultaneous translation of the presser elements along the strip-like element away from the equatorial plane is determined, so as to cause application of said strip-like element on the toroidal support along the whole length thereof, by a pressing action progressively extending to the opposite ends of the strip-like element starting from the central portion.

Document WO 2009/068939 in the name of the same Applicant discloses a method of building a carcass ply on a forming drum. The carcass ply is made using building devices intended for application of a plurality of strip-like elements in circumferential mutual-contact relationship with each other on the forming drum, so as to form at least one ply layer having a continuous circumferential extension around the geometric axis of said forming drum, in the same manner as described above for building of the belt structure on the toroidal support with reference to document WO 01/38077.

Document EP 0 956 940 discloses a method and an apparatus for making a reinforcing layer of a tyre on the outer peripheral surface of a rigid support. Ribbon sections, each comprising parallel steel cords covered with rubber, are attached in succession onto the outer peripheral surface of the rigid support along a circumferential direction, with the side edges of the ribbon sections in contact with the edges of the adjacent sections. The sections are carried and applied onto the rigid support by the arms of industrial robots provided with magnetic bodies at their ends, which bodies are able to retain said sections as they include the aforesaid steel cords.

SUMMARY OF THE INVENTION

The Applicant has noticed that, using deposition methods and units of known type as those described above, not all the strip-like elements, once they have been laid on their forming drum, appear to be positioned in a correct manner according to the design parameters.

The Applicant has in particular seen that the axial position of the strip-like elements is not the same for all of them. Some strip-like elements appear to be displaced in the axial direction, towards one side of the forming drum rather than towards the opposite one and relative to the central position referred to the equatorial plane of the forming drum, by a randomly varying amount "$\Delta s$".

The Applicant has further ascertained that this dangerous phenomenon is for instance due to the different tractive force that the two auxiliary retaining elements and the two presser elements, described in WO 01/38077 and WO 2009/068939, exert in opposite directions on the strip-like element during movement of the support elements away from each other. As a matter of fact, the tractive forces that the support elements exert on the strip-like element are substantially proportional to the axial-translation speeds of the support elements. As a result, also possible dissymmetries between the two tractive forces are enhanced by the increase of said translation speeds.

The Applicant has also noticed that the adhesion force of the strip-like element on the surface of the forming drum only due to the stickiness of the elastomeric material forming it is not sufficient to prevent the strip-like element from axially moving, owing to the above mentioned differential traction.

The Applicant has then observed that the axial displacement of the strip-like elements also varies as a function of the stickiness of the elastomeric material forming said strip-like elements.

In addition, the above observations have led the Applicant to believe that the drawbacks highlighted above are more critical in deposition processes employing substantially cylindrical forming supports, because the surface region on which the strip-like element is laid is substantially flat and the axial displacement of said strip-like element is more likely to occur than when deposition takes place on a toroidal support where the contact with a deposition surface that is curved on both sides of the support improves adhesion of the strip-like element.

The Applicant has finally observed that the apparatus described in the aforesaid document EP 0 956 940, due to the presence of robot arms, is complicated, expensive and unable to ensure high deposition speeds.

The Applicant has perceived that for overcoming the drawbacks set out above it is necessary to carry out locking of at least one portion of the strip-like element on its deposition surface to enable the whole deposition operation to take place following the design parameters.

The Applicant has finally found that, by locking a central portion of the strip-like element on the forming drum by means of a counter-element, during deposition of same, a correct axial position of all the strip-like elements can be ensured.

More specifically, in a first aspect, the present invention relates to a process for building tyres for vehicle wheels comprising: assembling components of the tyre on a forming drum, wherein at least one of said components is assembled through laying of strip-like elements disposed close to each other on a deposition surface radially external to the forming drum; wherein laying of each strip-like element comprises: moving said strip-like element close to the deposition surface; locking a central portion of the strip-like element against said deposition surface; pulling said strip-like element in opposite directions starting from the central portion towards the opposite ends thereof, while the central portion is maintained in a locked condition against said deposition surface, for progressively laying down said strip-like element against said deposition surface.

In this way, the correct design position of each strip-like element along the axial extension of the forming drum is ensured and, as a result, also ensured is the correct placement of the strip-like elements constituting the carcass plies and/or the belt structure within the tyre thus built, irrespective of the type of compound the strip-like elements are made of. In fact, possible non-perfectly symmetric tractive forces acting on the strip-like element during deposition are not able to move the strip-like element itself, because the latter is retained against the forming drum at its central portion.

In a second aspect, the present invention relates to an apparatus for building tyres for vehicle wheels comprising: at least one forming drum; at least one assembling device for assembling components of a tyre on the forming drum; wherein said at least one assembling device comprises: a laying unit comprising two support elements for a strip-like element to be laid; devices for transverse actuation, operating on the support elements for translating said support elements along a substantially axial direction of the forming drum between a first operating condition, at which they are disposed close to each other, and a second operating condition at which they are moved away from each other; devices for radial actuation, operating on the support elements and designed to translate said support elements between a position at which they are moved radially close to a deposition surface that is radially external to the forming drum and a position at which they are moved radially away from said deposition surface; a retaining unit comprising a counter-element movable between a first position at which it is spaced apart from the two support elements, and a second position at which it is placed between the two support elements and against said deposition surface.

By adopting the retaining unit it is possible to increase the speed with which the support elements are moved apart from each other, thereby reducing the time required for deposition of each individual strip-like element and the overall time of a cycle for assembly of the carcass ply/plies and/or the belt structure. The Applicant in fact has verified that a correct axial position of the strip-like elements is ensured with use of the retaining unit also if the speed of the support element is increased, and the difference between the tractive forces being increased too, because the strip-like element remains in any case in a fixed axial position on the forming drum during its progressive application onto the deposition surface.

The present invention, in at least one of the above aspects, can have one or more of the preferred features hereinafter described.

Preferably, the process comprises: progressively pressing the strip-like element against said deposition surface starting from the central portion towards the opposite ends thereof while the central portion is being maintained in a locked condition against said deposition surface. Adhesion of the strip-like element to the deposition surface does not only rely on the weight of same but also on the action of possible auxiliary members progressively pushing it against said surface.

Preferably, the process comprises: pressing said central portion of the strip-like element against said deposition surface by means of a counter-element, for locking said strip-like element against the forming drum.

More preferably, the process comprises: supporting the strip-like element by means of two support elements, moving the support elements and strip-like element along a radial trajectory towards the forming drum, to make the strip-like element approach the deposition surface.

In addition, the process comprises: bringing a counter-element against the central portion of the strip-like element and pressing said central portion of the strip-like element, through the counter-element, against said deposition surface for locking the strip-like element against said deposition surface.

Furthermore, the process comprises: moving the two support elements apart from each other along a substantially axial direction causing them to slide relative to the strip-like element, for progressively applying the strip-like element against the deposition surface, by pulling it in said opposite directions.

By virtue of the above described features, application of the strip-like elements is accurate, simple and quick.

Preferably, the two support elements are moved apart from each other along a substantially axial direction at a translation speed that is included between about 3 m/s and about 5 m/s, as measured relative to the deposition surface.

Preferably, the two support elements are moved apart from each other along a substantially axial direction, making them slide relative to the strip-like element after the counter-element has started pressing the strip-like element against said deposition surface.

Moreover, preferably, the counter-element goes on pressing the strip-like element against said deposition surface until moving apart of the two support elements from each other has been completed.

The counter-element acts over the whole time the strip-like element is submitted to the tractive action of the two support elements, so as to avoid any axial movement of said strip-like element.

According to a preferred embodiment, the process comprises: moving the counter-element from a first position at which it lies spaced apart from the radial trajectory of the support elements and the strip-like element, to a second position at which it lies against said central portion.

In the first position the counter-element is such positioned that it does not interfere with the strip-like element while the latter is being taken to the forming drum by the support elements.

Preferably, the process comprises: translating the counter-element along a direction substantially perpendicular to the deposition surface until bringing it against the central portion of the strip-like element.

The linear movement of the counter-element bringing the latter into contact with the strip-like elements prevents generation of side thrusts during impact of the counter-element against the strip-like element, which thrusts could move the strip-like element from its correct position.

In a preferred embodiment the process comprises: rotating the counter-element from the first position to an intermediate position, at which it is positioned between the two support elements and over the strip-like element, subsequently translating the counter-element along a direction perpendicular to the deposition surface.

The rotating movement enables the counter-element to be moved within a limited space and therefore the bulkiness of the retaining unit and the deposition unit can be reduced.

Preferably, translation of the counter-element is partly simultaneous with the radial movement of the support elements and the strip-like element towards the forming drum.

The vertical movement of the counter-element is simultaneous with the last part of the vertical movement of the strip-like element for reducing the deposition time to a minimum.

Preferably, the process comprises: moving the counter-element from the first position to the second position in a period of time included between about 0.05 s and about 0.1 s. Intervention of the counter-element is therefore substantially instantaneous.

In addition, preferably, the strip-like element is progressively applied to the deposition surface and pulled in opposite directions starting from the central portion towards the opposite ends of said strip like element over a period of time included between about 0.15 s and about 0.40 s. Therefore, each strip-like element is laid in a period of time included between about 0.20 s and about 0.50 s.

In a preferred embodiment the process comprises: rotating the forming drum through an angular pitch after deposition of each strip-like element, for laying a subsequent strip-like element (13).

According to an embodiment of the apparatus, in a first operating configuration of the assembling device, the support elements are in the first operating condition and in the position at which they are radially moved apart from each other and the counter-element is in the first position.

In a second operating configuration of the assembling device, the support elements are in the first operating condition and in the position they are radially moved close to each other and the counter-element is in the second position.

In a third operating configuration of the assembling device, the support elements are in the second operating condition and in the position at which they are radially moved close to each other and the counter-element is in the second position.

The movements of the laying unit and the retaining unit are synchronised so that they operate with the maximum speed and are fully safe.

In a preferred embodiment, the counter-element is movable, starting from the first position towards the second position, first along an arched trajectory and subsequently along a rectilinear trajectory perpendicular to the deposition surface.

The starting arched trajectory enables the counter-element to be brought to between the support elements, and the final rectilinear trajectory inhibits generation of tangential forces on the strip-like element.

In a preferred embodiment, the retaining unit comprises at least one actuator operatively in engagement with the counter-element to move it between the first and second positions.

In addition, preferably, the retaining unit comprises a locking device acting on said actuator and movable between a locking position, at which it keeps the counter-element in the first position, and a released position at which it allows movement of the counter-element to the second position upon the action of the actuator.

Use of an actuator, preferably of the pneumatic type, and the locking device enables the intervention of the counter-element to be speeded up at best, because the pneumatic actuator is put under pressure while the locking device retains it. Once released, the pneumatic actuator suddenly moves the counter-element.

In a preferred embodiment, the retaining unit comprises: a support body having an arched guide; a carriage mounted on the support body and movable relative to said support body along a rectilinear trajectory substantially perpendicular to the deposition surface; wherein the counter-element is hinged on the carriage and operatively in engagement with the arched guide of the support body.

The structure of the retaining element is simple, sturdy and reliable.

In a preferred embodiment, each support element comprises at least one support roller and at least one counter roller facing the support roller; said at least one support roller and counter-roller having respective rotation axes transverse to the substantially axial direction of the forming drum; the strip-like element being able to be interposed between said support roller and counter roller.

In addition, preferably, each support element comprises a plate having a surface for support of the strip-like element; wherein said at least one support roller is located in a seat formed in said surface of the plate.

Deposition of the strip-like element only relies on the (radial and axial) movement of the support elements, without presser elements being adopted for pushing the strip-like element directly against the deposition surface, as described, for example, in the aforesaid documents WO 01/38077 and WO 2009/068939 (in which the presser elements are mounted on board the support elements being movable together with the auxiliary retaining elements), because the strip-like element is already retained on the forming drum by the counter-element. The structure of the laying unit is therefore particularly simple.

Preferably, the radially external surface of the forming drum is substantially cylindrical.

Use of the retaining unit is particularly efficient and useful in combination with substantially cylindrical drums, because the surface region of axial extension on which the strip-like element is laid down is substantially flat and the dangerous axial displacement of the strip-like elements, occurring in the apparatuses of known type, is more important than during laying on toroidal supports.

In a preferred embodiment, the apparatus comprises a device for varying the diameter of the radially external surface of the forming drum and a device for radially positioning the laying unit and retaining unit relative to the forming drum as a function of said diameter.

The apparatus enables building of tyres with different sizes without replacing the drum and the laying and retaining units.

BRIEF DESCRIPTION OF THE DRAWINGS

Further features and advantages will become more apparent from the detailed description of a preferred but not exclusive embodiment of a process and an apparatus for building tyres for vehicle wheels in accordance with the present invention. This description will be set out hereinafter with reference to the accompanying drawings, given by way of non-limiting example, in which:

FIG. 1b is a partly sectioned side view of the enlarged portion in FIG. 1a;

DETAILED DESCRIPTION OF THE INVENTION

Figure 1:
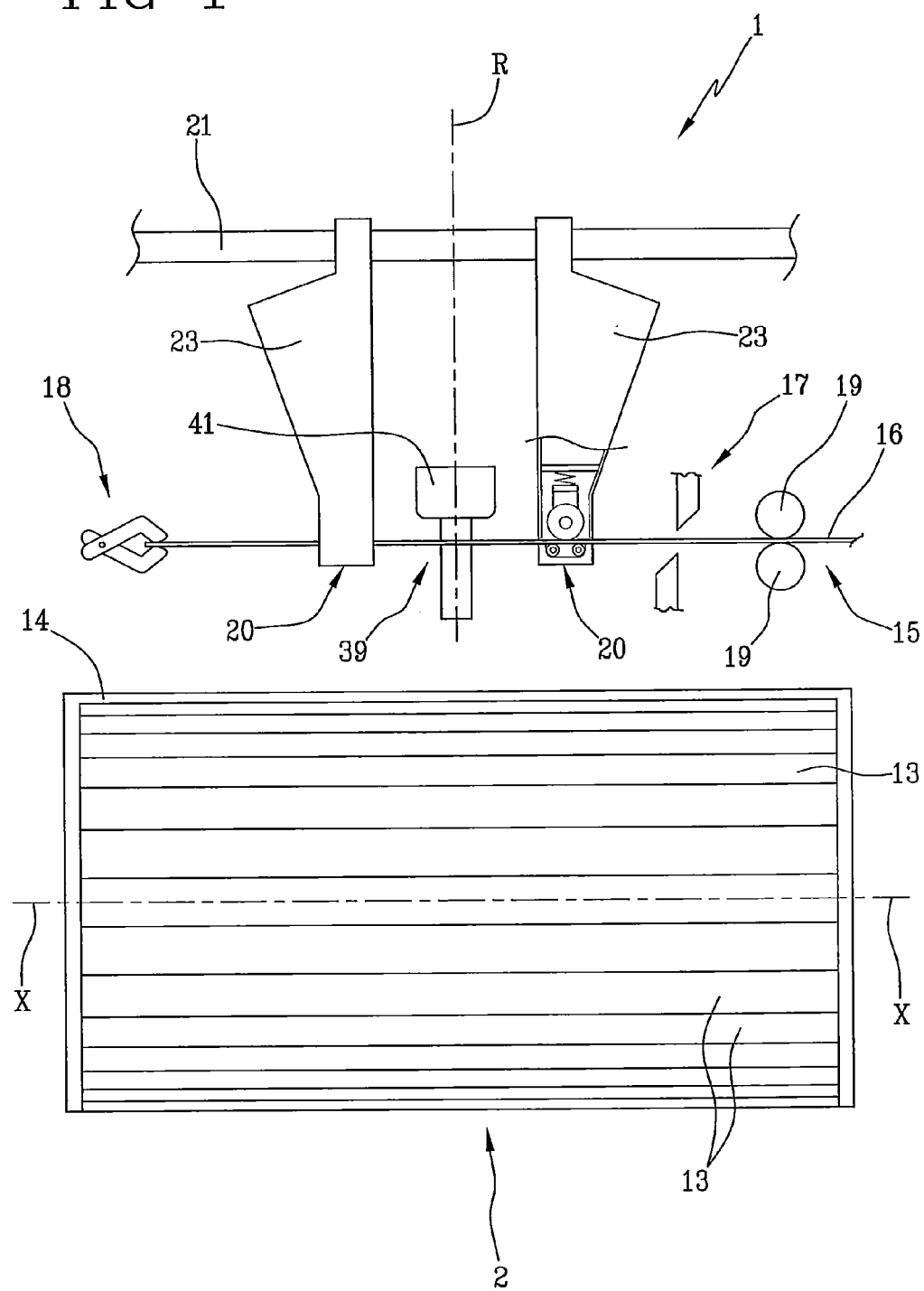
FIG. 1 diagrammatically shows a front view of a laying unit in a first operating configuration and a forming drum, both belonging to an apparatus for building tyres according to the present invention.

In FIG. 1 a laying unit associated with a forming drum 2 is identified with reference numeral 1.

Figure 7:
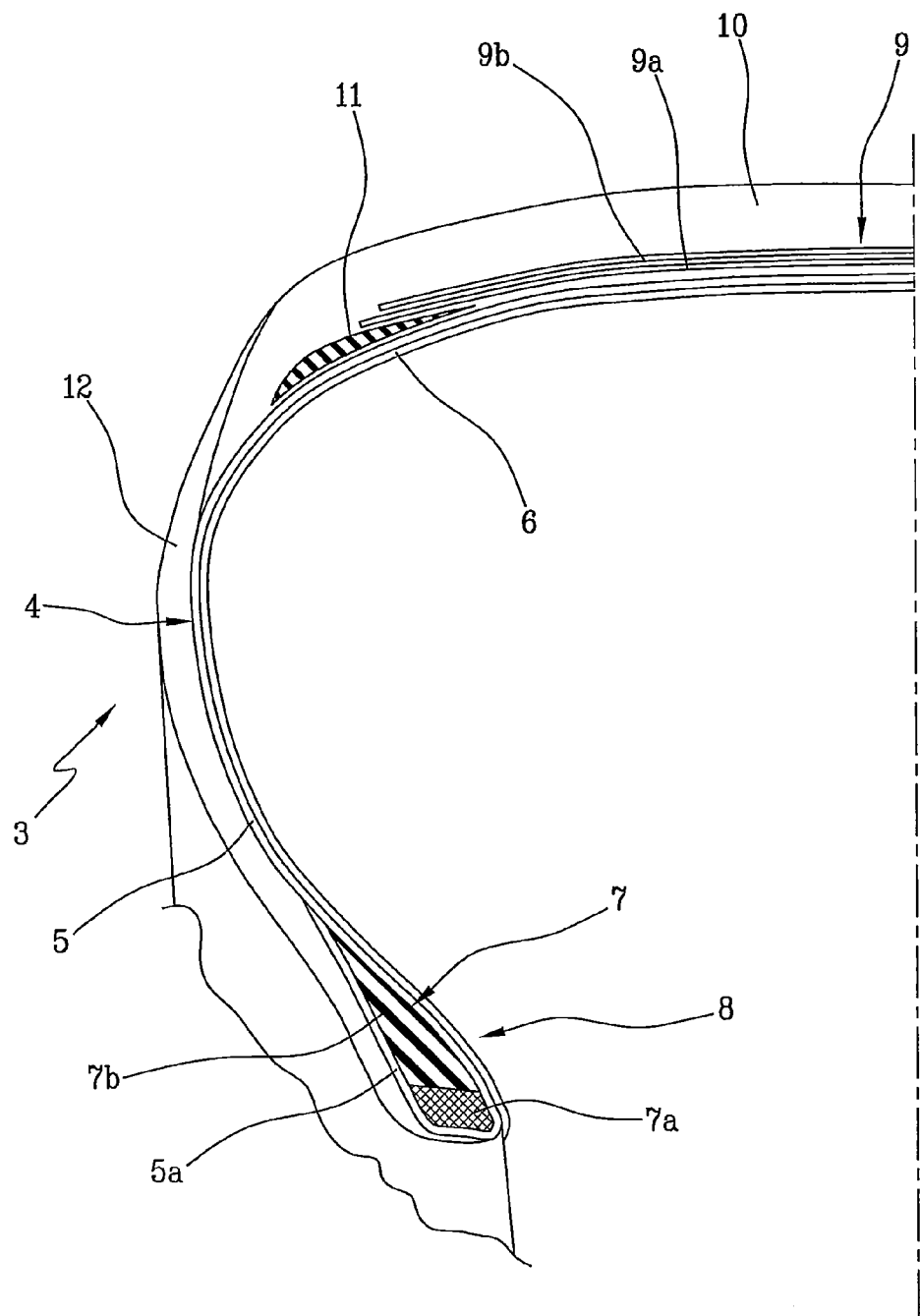
FIG. 7 is a fragmentary diametrical section of a tyre obtainable with the process and apparatus in question.

The laying unit 1 and forming drum 2 belong to an apparatus for building tyres 3 for vehicle wheels, which tyres 3 essentially comprise a carcass structure 4 having at least one carcass ply 5 (FIG. 7).

A layer of airtight elastomeric material, a so-called "liner" 6, can be applied to the inside of the carcass ply/plies 5. Two annular anchoring structures 7, each comprising a so-called bead core 7a carrying an elastomeric filler 7b at a radially external position are in engagement with respective end flaps 5a of the carcass ply or plies 5. The annular anchoring structures 7 are integrated in the vicinity of regions usually identified as "beads" 8, at which usually engagement between tyre 3 and a respective mounting rim occurs. A belt structure 9 comprising one or more belt layers 9a, 9b is circumferentially applied around the carcass ply/plies 5, and a tread band 10 is circumferentially superposed on the belt structure 9. So-called "under-belt inserts" 11 can be associated with the belt structure 9, each of them being located between the carcass ply/plies 5 and one of the axially opposite end edges of the belt structure 9. In addition to the under-belt inserts 11, or as an alternative, annular inserts (not shown) of elastomeric material and/or comprising textile or metallic cords substantially parallel to the circumferential extension direction of the tyre (belt layer to 0 degrees), or other reinforcing elements can be radially superposed at least on the axially opposite end edges of the belt layers 9a, 9b, and/or interposed between the belt layers 9a, 9b, at least at said end edges. Two sidewalls 12, each extending from the respective bead 8 to a respective side edge of the tread band 10, are applied to the carcass ply/plies 5 at laterally opposite positions.

Building of tyre 3 as above described is carried out through assembly of respective semifinished products on the building drum 2 by means of at least one assembling device Tyre 3 thus built lends itself to be submitted to a curing treatment and/or other processing operations provided in the work cycle.

In the embodiment shown, built and/or assembled on the forming drum 2 is at least part of the components designed to form the carcass structure 4 of tyre 3. More particularly, the forming drum 2 is adapted to first receive liner 6, if any, and subsequently the carcass ply or plies 5. Afterwards, devices not shown coaxially engage one of the annular anchoring structures 7 around each of the end flaps 5a, set an outer sleeve comprising the belt structure 9 and tread band 10 at a coaxially centred position around the cylindrical carcass sleeve, and shape the carcass sleeve into a toroidal configuration through radial expansion of the carcass ply, so as to determine application of same against a radially internal surface of the outer sleeve.

In accordance with the present invention, during building of tyre 3, the carcass ply 5 is made by means of the laying unit 1 designed for application of a plurality of strip-like elements 13 in circumferential mutual-contact relationship on a deposition surface 14 radially external to the forming drum 2, so as to form at least one ply layer having a continuous circumferential extension around the geometric axis "X-X" of said forming drum 2. In this regard, it is important to point out that said deposition surface 14 can be the radially external surface of the forming drum 2 itself or, preferably, the radially external surface of some components of tyre 2 already laid on said forming drum 2, such as liner 6, for example. The radially external deposition surface 14 of the forming drum 2 shown is substantially cylindrical and is suitable for manufacture of a cylindrical carcass sleeve.

The forming drum 2 is positioned and rotatably supported around its geometric axis "X-X". Devices not shown, in the form of a motor-driven mandrel for example, are used to set the forming drum 2 in rotation about said geometric axis "X-X".

The laying unit 1 is mounted close to the forming drum 2 and is suitable to apply the strip-like elements 13 on said forming drum 2 during rotation thereof. Preferably, the forming drum 2 is rotated by steps and after each rotation step the laying unit 1 applies one strip-like element 13.

Apparatus 1 further comprises a feeding unit 15 designed to supply the laying unit 1 with the strip-like elements 13 of predetermined length, one by one. The strip-like elements 13 are obtained by cutting operations sequentially carried out on at least one continuous elongated element 16 coming from a drawing and/or calendering device, or a feeding reel, and therefore all have the same width "W". Preferably, this width "W" is included between about 20 mm and about 40 mm.

The continuous elongated element 16, and consequently the strip-like elements 13 obtained therefrom, have a plurality of cords or similar thread-like elements of metal or textile material, extending parallel to each other along the longitudinal extension of the elongated element and the strip-like element itself, and at least partly coated with a layer of elastomeric material applied through a drawing and/or calendering operation.

Each feeding unit 15 comprises at least one cutting member 17 designed to cut-off the continuous elongated element 17 perpendicularly or according to a predetermined inclination to the longitudinal extension of same, for obtaining the individual strip-like elements 13.

Combined with the cutting member 17 is at least one pick-up member 18 movable between a first work position at which it engages one final end of the continuous elongated element 16 close to the cutting member 17, and a second work position at which it is moved apart from the cutting member 17.

Following translation from the first to the second work positions, the pick-up member 18 drags along the continuous elongated element 16 so as to lay it down beyond the cutting member 17 and preferably at a radially approached position relative to the forming drum 2, over a stretch of a length corresponding to that of the strip-like element 13 to be obtained following the subsequent operation of the cutting member 17.

In the accompanying figures, denoted at 19 is a pair of guide rollers operating on the continuous elongated element 16 at a region immediately upstream of the cutting member 17.

The laying unit 1 comprises two support elements 20 movable along a guide structure 21 upon the action of transverse-actuation devices, of the worm screw type for example, not shown as they can be made in any manner convenient to a person skilled in the art. The support elements 20 lend themselves to retain the strip-like element 13 at the instants intervening between cutting of said strip-like element upon the action of the cutting member 17 and application of same onto the forming drum 2.

Figure 1A:
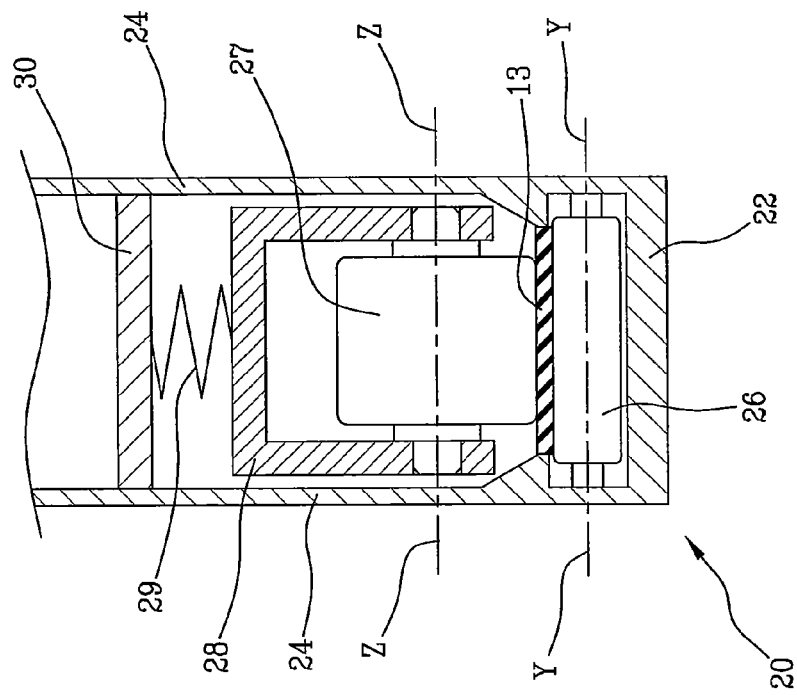
FIG. 1a is an enlarged and partly sectioned portion of the laying unit seen in FIG. 1.
Figure 1B:
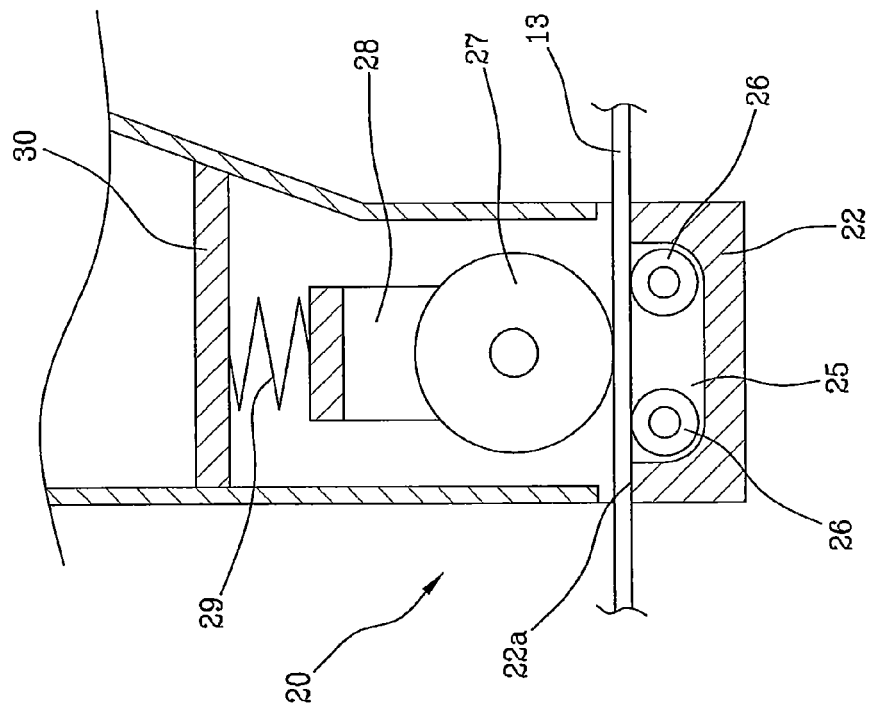

In greater detail, as shown in FIGS. 1*a* and 1*b*, each support element 20 comprises a plate 22 having a surface 22*a* on which the elongated element 16 dragged along by the pick-up member 18 and the cut-off strip-like element 13 rest.

Each plate 22 is carried at the lower end of a respective arm 23 connected, at its opposite end, to the guide structure 21. The guide structure 21 extends along a direction coincident with an axial direction referred to the forming drum 2 or has a predetermined angle relative to this axial direction, which angle is preferably included between about 5° and about 20°, being established based on the orientation that the strip-like elements 13 must take on the deposition surface 14 radially external to the forming drum 2.

The plate 22 is connected to the respective arm 23 through side walls 24 forming, together with the plate itself, a C-shaped guide laterally confining the path of the strip-like element 13 (FIG. 1*b*).

Formed in plate 22 is a seat 25 in which two support rollers 26 are located which are free to rotate about respective longitudinal axes "Y-Y" oriented transversely of the longitudinal extension of plate 13. The support rollers 26 emerge from the surface 22*a* so that the strip-like element 13 can rest thereon.

Each of the support elements 20 further comprises a counter-roller 27 facing the support rollers 26 (FIGS. 1*a* and 1*b*). The counter-roller 27 is rotatably mounted on a frame 28 for free rotation around its rotation axis "Z-Z". A spring element 29, a helical spring for example, interposed between frame 28 and an upper wall 30 of the respective arm 23 pushes the counter-roller 29 towards the support rollers 26 and the strip-like element 13 when the latter is retained on the support elements 20.

Figure 2:
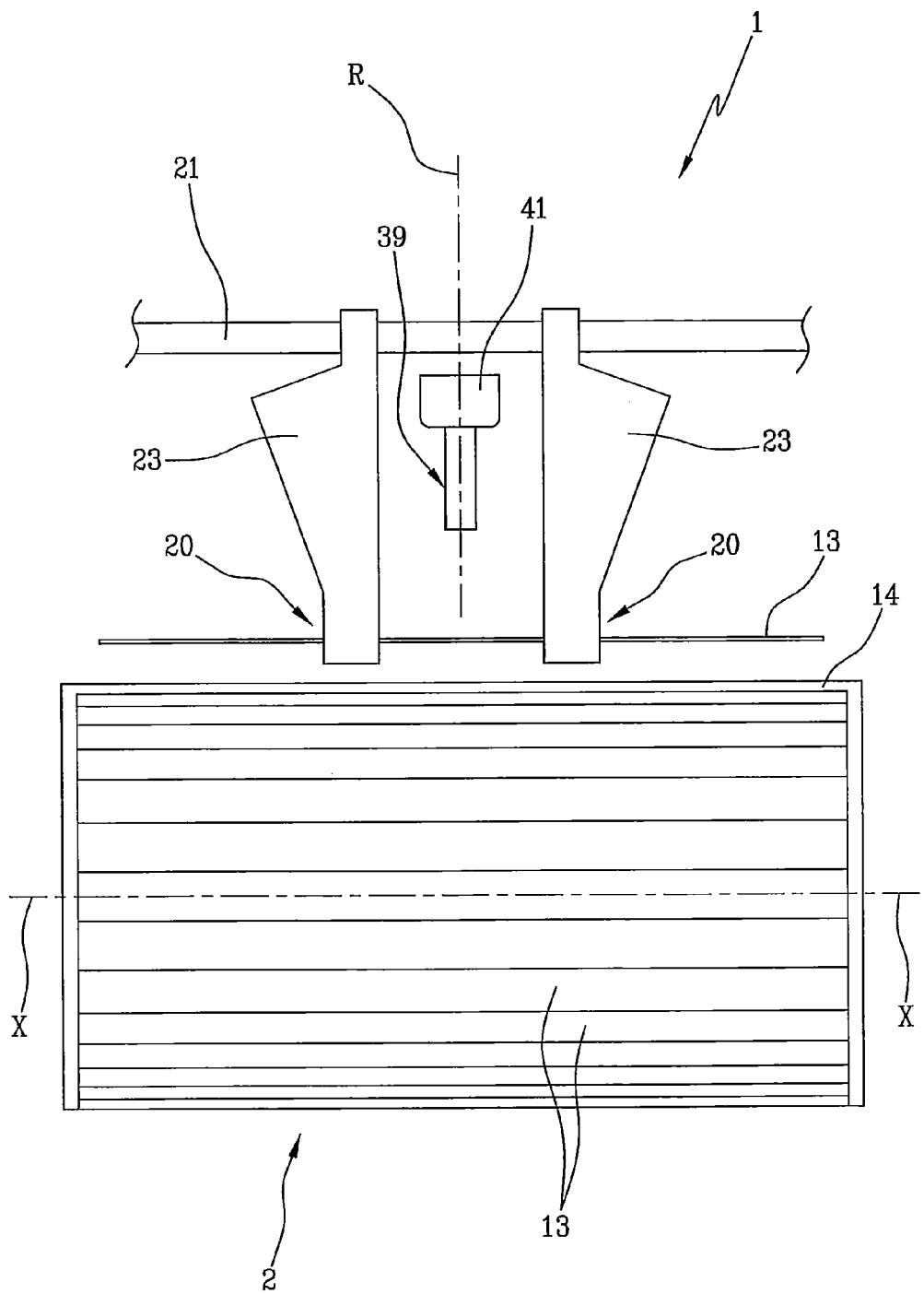
FIG. 2 shows the laying unit seen in FIG. 1 in a second operating configuration.

Associated with the support elements 20 are radial-actuation devices designed to translate said support elements 20 close to or away from the deposition surface 14 radially external to the forming drum 2 along a radial trajectory "R" (FIG. 2).

These radial-actuation devices are not shown or described in detail as they can be made in any manner convenient to a person skilled in the art, and for example can operate on the guide structure 21 and/or directly on the support elements 20, in order to bring the strip-like element 13 in contact relationship with the deposition surface 14.

The assembling device, of which the laying unit 1 is part too, further comprises a retaining unit 31 (FIGS. 5 and 6) the function of which is to hold each strip-like element 13 against the deposition surface 14 during application of same operated by the support elements 20.

The retaining unit 31 comprises a support body 32 in turn including a support plate 33 disposed in a radial and preferably vertical plane relative to the forming drum 2. Mounted on the support plate 33 and integral therewith is a guide plate 34 extending perpendicular to the support plate 33. Formed in the guide plate 34 is an arched guide 35 in the form of a groove, extending over an arc subtending an angle of about 90°. The arched guide 35 has a lower end stretch 35*a* substantially rectilinear and aligned with a radial trajectory "R" referred to the forming drum 2, and an upper end stretch perpendicular to the radial trajectory "R". The arched guide 35 extends from the lower end stretch 35*a* to the support plate 33.

Figure 5:
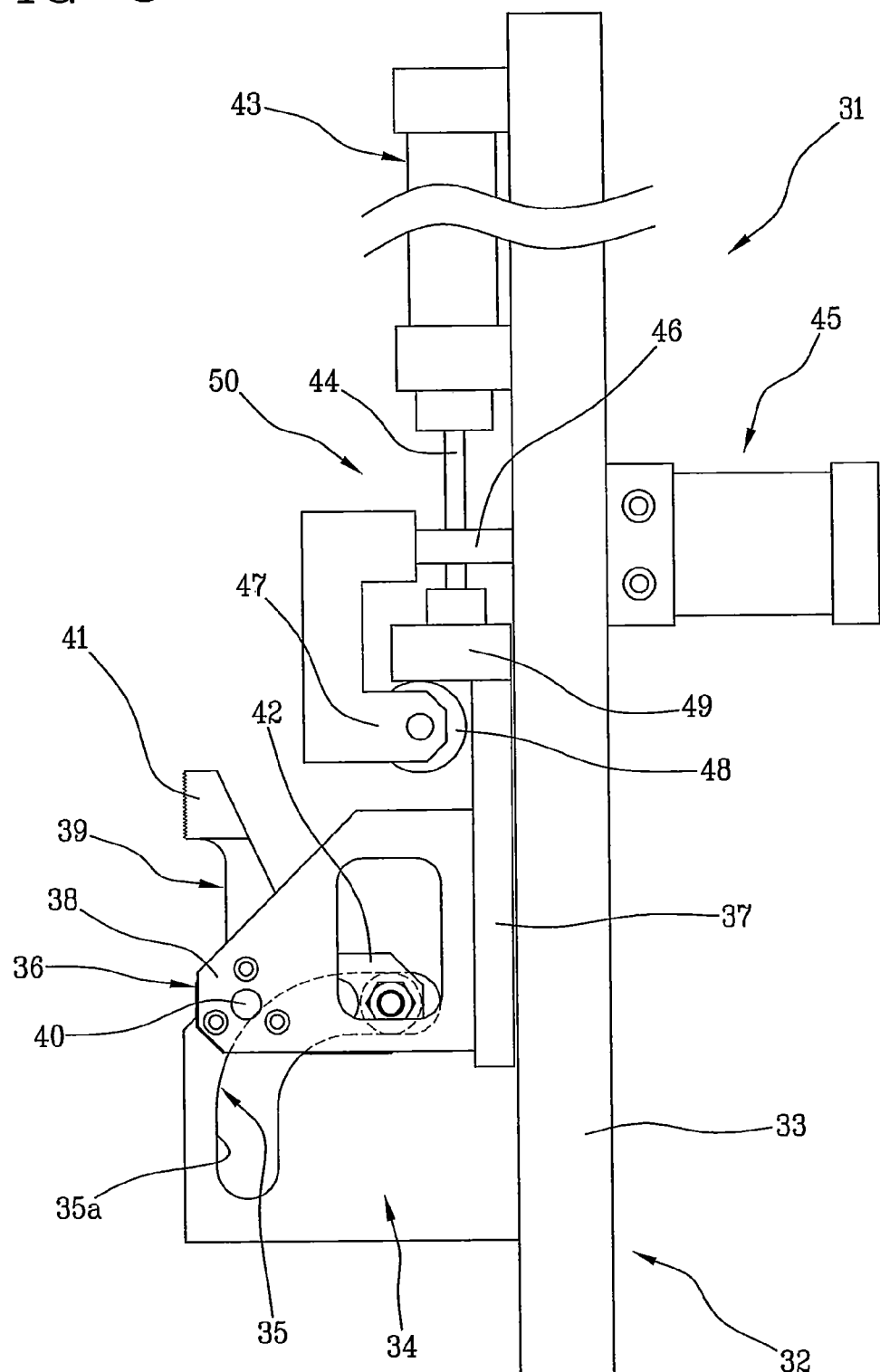
FIG. 5 is a side view of a retaining unit in a first position corresponding to the first operating configuration of the laying unit.
Figure 6:
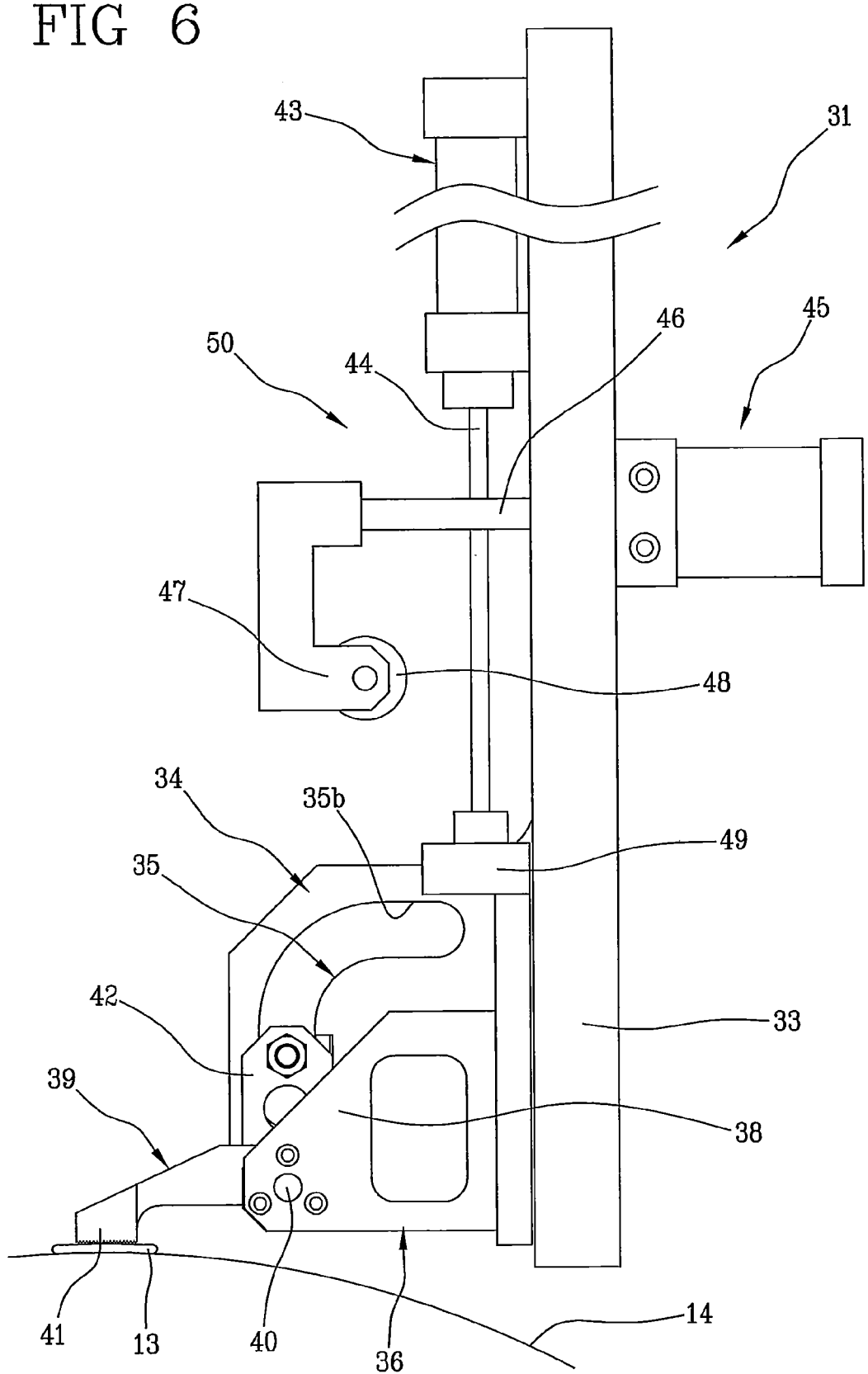
FIG. 6 shows the retaining unit seen in FIG. 5 in a second position corresponding to the third and fourth operating configurations of the laying unit.

The retaining unit 31 comprises a carriage 36 slidable on the support plate 33 in a rectilinear guide, not shown, extending in a radial and preferably vertical direction referred to the forming drum 2. Carriage 36 comprises a first portion 37 operatively in engagement with the rectilinear guide and a second portion 38 defined by a movable plate integral with the first portion 37 and extending alongside the guide plate 34. Carriage 36 is movable on the rectilinear guide between a first position, at which it lies close to the upper end stretch 35*b* of the curved guide 35 (FIG. 5), and a second position at which it lies close to the lower end stretch 35*a* of the curved guide 35 (FIG. 6).

A first end of a small arm 39 is hinged on the second portion 38 at a fulcrum 40, so as to enable the small arm 39 to rotate around an axis parallel to the support plate 33. A second end of the small arm 39 carries a counter-element 41.

The first end of the small arm 39 is further integrally linked to a first end of a lever 42. Lever 42 is disposed perpendicular to the small arm 39 and parallel to the guide plate 34 and the movable plate 38 and interposed therebetween. A second end of said lever 42 is engaged in the curved guide 35 through a roller.

An actuator 43, preferably defined by a pneumatic cylinder, is mounted on the support plate 33 and connected through a control rod 44 thereof, to the first portion 37 of carriage 36. In the embodiment shown, actuator 43 is disposed over carriage 36, with the control rod 44 facing downwards and oriented in a radial direction relative to the forming drum 2.

The retaining unit 31 further comprises an auxiliary actuator 45 preferably defined by a pneumatic cylinder too, which is mounted on the support plate 33 and has a control rod 46 extending through the support plate 33. The control rod 46 of the auxiliary actuator 45 is perpendicular to the support plate 33, emerges from the face of the support plate 33 carrying carriage 36 and has a stop member 47 at a final end thereof which is provided with a roller 48. The stop member 47 cooperates with a protrusion 49 integrally mounted on the first portion 37 of carriage 36 in the vicinity of the connection with the control rod 41 of actuator 43. In the embodiment shown, the stop member 47 has a C-shaped conformation connected at one end with the control rod 46 and at the opposite end carrying roller 48. The auxiliary actuator 45 and protrusion 49 define a locking device 50.

The retaining unit 31 is movable between a first configuration (FIG. 5) and a second configuration (FIG. 6).

In the first configuration, carriage 36 is in the first position, the second end of lever 42 is engaged in the upper end 35b of the curved guide 35 and the small arm 39 lies in alignment with the support plate 33 and in a radial direction relative to the forming drum 2. The counter-element 41 is in its first position, spaced apart from the two support elements 20.

In the second configuration, carriage 36 is in its second position, the second end of lever 42 is engaged in the lower end 35a of the curved guide 35 and the small arm 39 is perpendicular to the support plate 33 and to a radial direction relative to the forming drum 2. The counter-element 41 is in its second position, set against the deposition surface 14.

During movement from the first to the second configurations, the small arm 39 and counter-element 41 first describe an arched trajectory and subsequently a rectilinear trajectory substantially perpendicular to the deposition surface 14.

In use, while the support elements 20 are in the first operating condition, at which they are close to each other and spaced apart from the deposition surface 14 radially external to the forming drum 2 (FIG. 1), the retaining unit 31 is in the first configuration (FIG. 5), the small arm 39 and counter-element 41 are alongside each other and spaced apart from the radial trajectory "R" followed by the support elements 20 for moving close to the forming drum 2 (first operating configuration of the assembling device). As shown in FIG. 5, carriage 36 is retained in the first configuration by the stop member 47 which is close to the support plate 33 and, being disposed under the protrusion 49, prevents descent of said carriage 36.

After carrying out cutting to size of the strip-like element 13, the support elements 20 are radially moved close to the forming drum 2 (FIG. 2). The pneumatic actuator 43 is put under pressure but it cannot move carriage 36 because the stop member 47 is still in its locking position.

Figure 3:
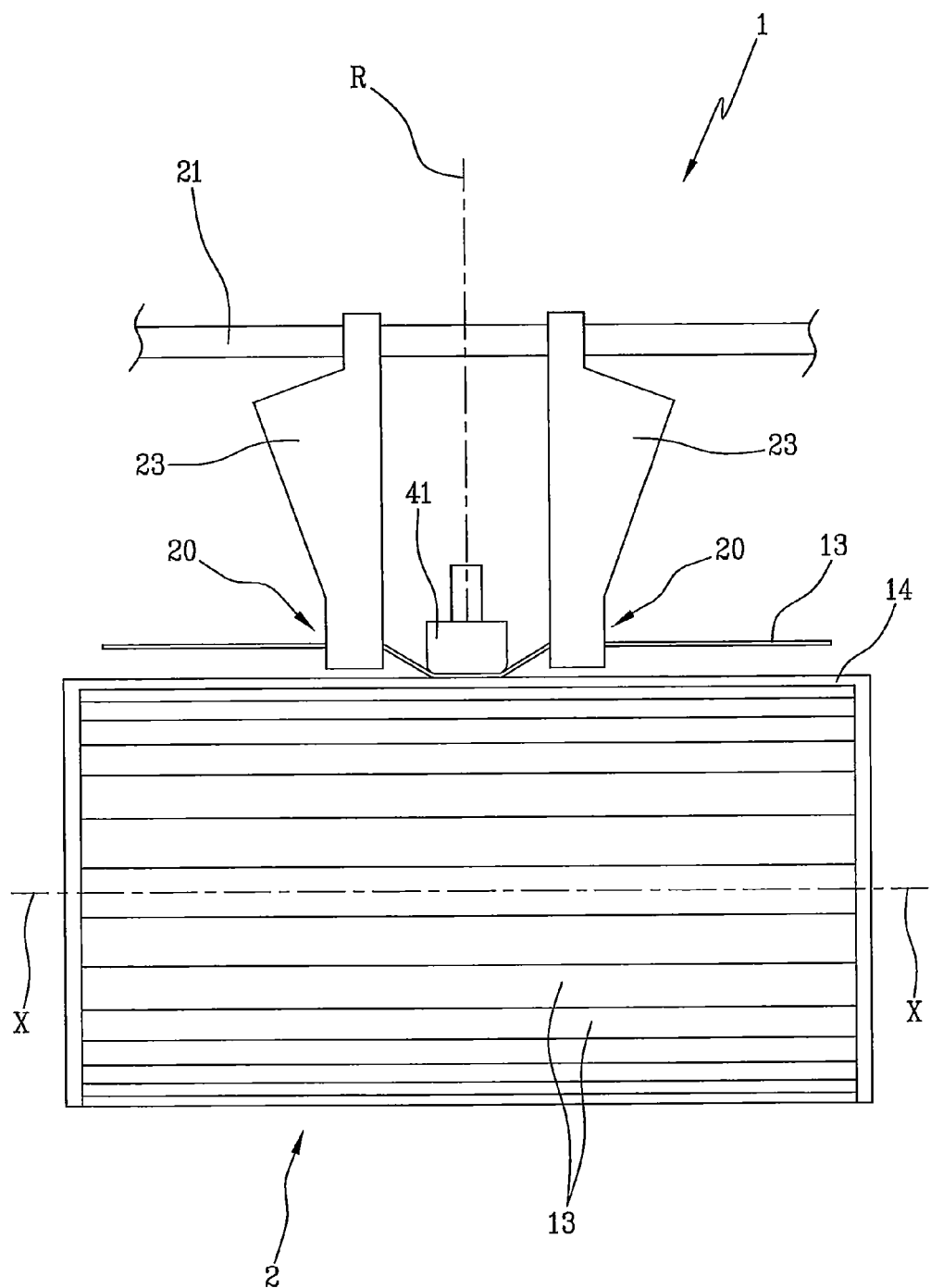
FIG. 3 shows the laying unit of FIG. 1 in a third operating configuration.
Figure 4:
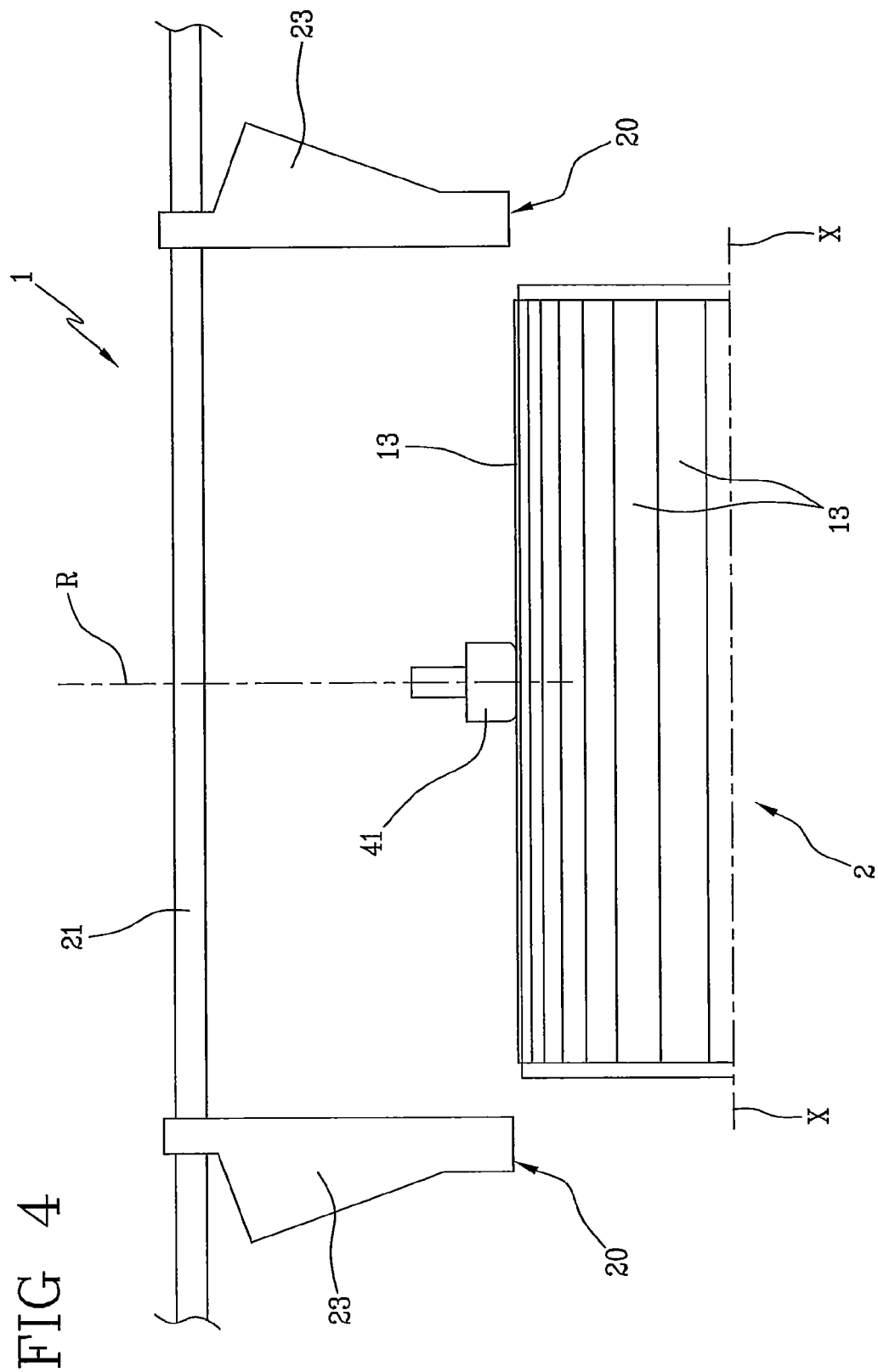
FIG. 4 shows the laying unit of FIG. 1 in a fourth operating configuration.

When the support elements 20 are about to reach or have reached the position which is the closest to the forming drum (FIG. 2) or the deposition surface 14, the auxiliary actuator 45 is driven and the stop member 47 is moved away from the support plate 33. Carriage 36 is now free to translate and is pushed downwards by the pneumatic actuator 43, causing rotation-translation of the small arm 39 until bringing the counter-element 41 against a central portion of the strip-like element 13 (FIGS. 3 and 6; second operating configuration of the assembling device). Translation of the counter-element 41 is partly simultaneous with the radial movement of the support elements 20 and the strip-like element 13 towards the forming drum 2. Movement of the counter-element 41 from the first to the second positions is carried out in a time "$t_1$" preferably included between about 0.05 s and about 0.1 s.

While the strip-like element 13 is locked on the deposition surface 14 by means of the counter-element 41, the support elements 20 are moved apart from each other, preferably at a translation speed, measured relative to said deposition surface 14, included between about 3 m/s and about 5 m/s (third operating configuration of the assembling device).

The support rollers 26 and counter-roller 27 of each support element 20 roll on the strip-like element 13 and pull it in opposite directions until the ends thereof are reached and released preferably in a time "$t_2$" included between about 0.15 s and about 0.40 s. The strip-like element 13 is progressively laid down starting from the central portion towards the opposite ends thereof and it adheres to and gets stuck on the forming drum 2.

In a variant of the apparatus, not shown, each of the support elements 20 further comprises a presser roller. The two presser rollers, during movement of the support elements apart from each other, progressively press the strip-like element 13 against the deposition surface 14, starting from the central portion towards the opposite ends thereof.

The deposition cycle of each strip-like element 13 is carried out in a time "$t_3$" included between about 0.20 s and about 0.50 s.

When deposition has been completed, the forming drum 2 is rotated through a pitch around its axis "X-X", the retaining unit 31 is brought back to its first configuration and the support elements 20 are brought back to their first operating condition. The just described cycle is repeated for application of each strip-like element 13.

In a variant not shown, the apparatus further comprises a device for varying the diameter of the radially external surface of the forming drum 2 and a device for radially positioning the laying unit 1 and retaining unit 31 relative to the forming drum 2 as a function of the drum diameter. To this aim, the support plate 32 is mounted, for instance, on a frame and can be displaced and locked on this frame to the desired position.

The invention claimed is:

1. A process for building a tyre for a vehicle wheel comprising:
assembling components of the tyre on a forming drum having a longitudinal axis, wherein at least one of said components is assembled through laying of strip-like elements disposed close to each other on a deposition surface radially external to the forming drum, wherein laying of one of the strip-like elements comprises:
moving said one of the strip-like elements close to the deposition surface;
moving a counter-element from a first position, at which the counter-element is positioned (i) at a radial distance from the longitudinal axis greater than a radial distance that said one of the strip-like elements is positioned from the longitudinal axis and (ii) circumferentially shifted over the deposition surface relative to said one of the strip-like elements, to an intermediate position at which the counter-element is positioned over said one of the strip-like elements, such that a radial line from the drum passes through both said one of the strip-like elements and the counter element, by rotating the counter-element, which is carried at a second end portion of an arm, around an axis parallel to the longitudinal axis, the counter element having a center of rotation about a fulcrum at a first end portion of the arm, while translating the fulcrum toward the deposition surface;

translating the counter-element perpendicular to the deposition surface from the intermediate position to a second position at which the counter-element lies against a central portion of said one of the strip-like elements and locks the central portion of said one of the strip-like elements against said deposition surface; and pulling said one of the strip-like elements in opposite directions starting from the central portion toward opposite ends thereof, the central portion being maintained in a locked condition against said deposition surface, for progressively laying down said one of the strip-like elements against said deposition surface.

2. The process as claimed in claim 1, comprising progressively pressing said one of the strip-like elements against said deposition surface starting from a portion axially outward with respect to the longitudinal axis from the central portion toward the opposite ends of the one of the strip-like elements, the central portion being maintained in the locked condition against said deposition surface.

3. The process as claimed in claim 1, comprising supporting said one of the strip-like elements by means of two support elements and moving the support elements and said one of the strip-like elements along a radial trajectory toward the forming drum to make said one of the strip-like elements approach the deposition surface.

4. The process as claimed in claim 3, comprising moving the two support elements apart from each other along an axial direction with respect to the longitudinal axis causing said support elements to slide relative to said one of the strip-like elements, for progressively applying said one of the strip-like elements against the deposition surface, by pulling said one of the strip-like elements in opposite directions.

5. The process as claimed in claim 3, wherein the two support elements are moved apart from each other along an axial direction with respect to the longitudinal axis at a translation speed that is between 3 m/s and 5 m/s, as measured relative to the deposition surface.

6. The process as claimed in claim 3, wherein the two support elements are moved apart from each other along an axial direction with respect to the longitudinal axis, causing said support elements to slide relative to said one of the strip-like elements after the counter-element has started pressing said one of the strip-like elements against said deposition surface.

7. The process as claimed in claim 6, wherein the counter-element goes on pressing said one of the strip-like elements against said deposition surface until moving-apart of the two support elements from each other has come to an end.

8. The process as claimed in claim 3, comprising translating the counter-element from the intermediate position along the direction perpendicular to the deposition surface until bringing the counter-element against the central portion of said one of the strip-like elements.

9. The process as claimed in claim 3, comprising the counter-element being positioned equidistantly between the two support elements.

10. The process as claimed in claim 8, wherein the translation of the counter-element until bringing the counter-element against the central portion is simultaneous with a part of the radial movement of the support elements and said one of the strip-like elements toward the forming drum.

11. The process as claimed in claim 1, comprising moving the counter-element from the first position to the second position in a period of time between 0.05 s and 0.1 s.

12. The process as claimed in claim 1, wherein said one of the strip-like elements is progressively applied to the deposition surface and pulled in opposite directions starting from the central portion toward the opposite ends of said one of the strip-like elements in a period of time between 0.15 s and 0.40 s.

13. The process as claimed in claim 1, wherein each of the strip-like elements is laid in a period of time between 0.20 s and 0.50 s.

14. The process as claimed in claim 1, comprising rotating the forming drum through an angular pitch after deposition of said one of the strip-like elements, for laying a subsequent strip-like element.

* * * * *